(12) United States Patent
Cherry et al.

(10) Patent No.: US 7,992,168 B2
(45) Date of Patent: Aug. 2, 2011

(54) DYNAMIC ZONING FOR TARGETED AD INSERTION

(75) Inventors: Guy Cherry, Beaverton, OR (US); Joseph R. Matarese, Portland, OR (US); Andrew J. B. Poole, Louisville, CO (US)

(73) Assignee: ARRIS Group, Inc., Suwanee, GA (US)

( * ) Notice: Subject to any disclaimer, the term of this patent is extended or adjusted under 35 U.S.C. 154(b) by 905 days.

(21) Appl. No.: 11/821,083

(22) Filed: Jun. 20, 2007

(65) Prior Publication Data
US 2008/0034386 A1    Feb. 7, 2008

Related U.S. Application Data

(60) Provisional application No. 60/815,395, filed on Jun. 20, 2006.

(51) Int. Cl.
*H04N 7/10* (2006.01)
(52) U.S. Cl. .................... 725/34; 725/35; 725/36
(58) Field of Classification Search .............. 725/34–35, 725/36
See application file for complete search history.

(56) References Cited

U.S. PATENT DOCUMENTS

| | | | | |
|---|---|---|---|---|
| 6,014,701 A | * | 1/2000 | Chaddha | 709/226 |
| 2002/0087976 A1 | * | 7/2002 | Kaplan et al. | 725/34 |
| 2005/0175008 A1 | * | 8/2005 | Thompson | 370/390 |
| 2007/0204292 A1 | * | 8/2007 | Riedl et al. | 725/34 |

* cited by examiner

*Primary Examiner* — Hunter B. Lonsberry
*Assistant Examiner* — Sumaiya A Chowdhury
(74) *Attorney, Agent, or Firm* — Troy A. Van Aacken; Robert J. Starr

(57) ABSTRACT

A custom ad selection and delivery system may include an ad selector to select candidate ads for one or more ad avail opportunities, a bandwidth resource manager to provide information about available bandwidth in a content delivery system, and a policy manager to weight ad avail opportunity versus bandwidth costs to delivery customized advertising to subscribers, and to cause allocation of bandwidth and insertion of customized ads into multiple program streams comprising the same program content but different ad content, and to cause different subscriber equipment to map different program frequencies to similar content streams having advertising content inserted therein that is customized to different subscriber demographics.

10 Claims, 2 Drawing Sheets

DYNAMIC ZONING FOR TARGETED AD INSERTION

PRIORITY CLAIM

The present application claims priority to U.S. provisional patent application DYNAMIC ZONING FOR TARGETED AD INSERTION, having application No. 60/815,395, filed on Tuesday, Jun. 20, 2006, which is incorporated herein by reference.

TECHNICAL FIELD

The present disclosure relates to switched digital broadcast networks and advertising delivery.

BACKGROUND

Targeted advertising is the selection of video advertisements for insertion into scheduled television programming in such a manner as to match the advertisement to an individual viewers' interest profile.

Advertising is an important revenue source to offset the cost borne by service providers in delivering increasingly sophisticated on demand and scheduled network programming to their television viewers. Insertion of advertisements into breaks in network programming is the typical means that service providers use to earn such revenue.

However, existing approaches for ad insertion do not provide sufficient granularity for tailoring advertisements to the specific tastes and preferences of viewers. The same ad is inserted over a large population of viewers regardless of detailed geographic, demographic or psychographic information.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Figure 1:
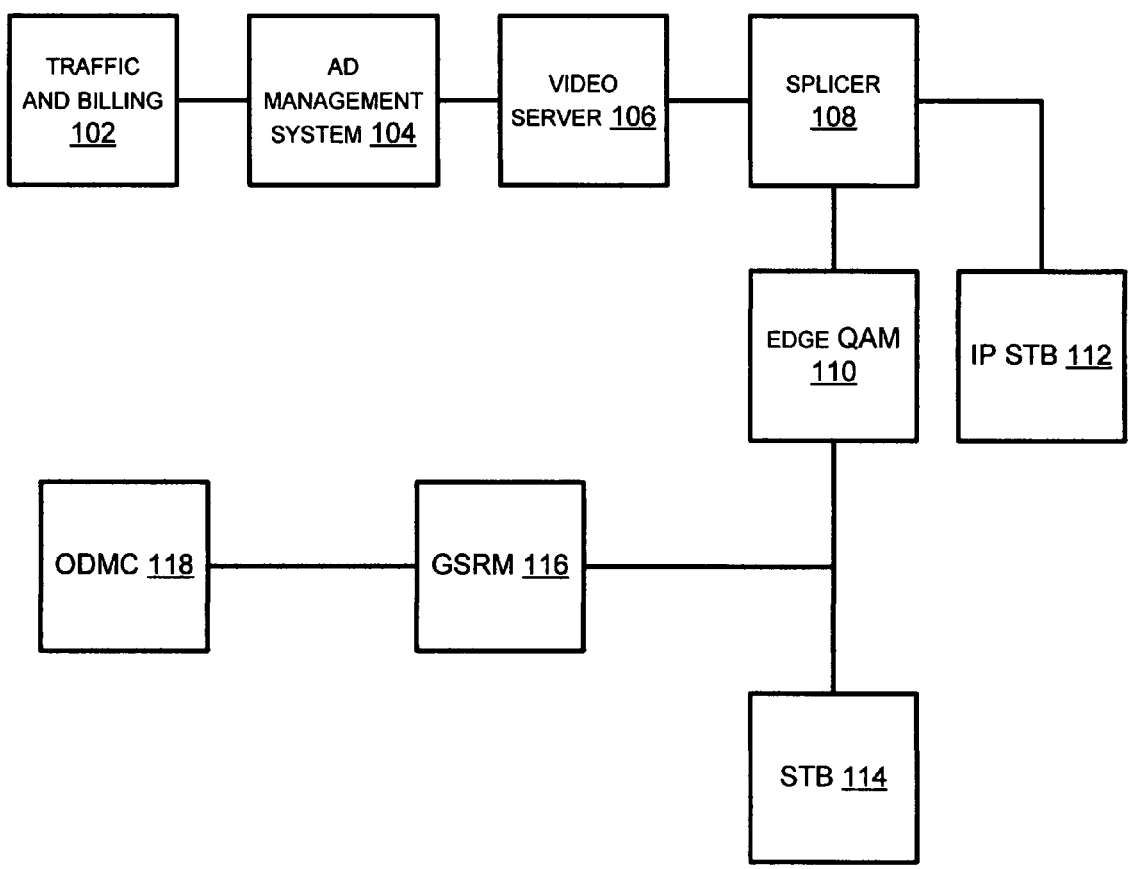
FIG. 1 is a block diagram of an embodiment of an ad selection and delivery system.

FIG. 1 is a block diagram of an embodiment of a switched digital cable television system. The system includes, but may not be limited to, a traffic and billing system 102, an ad management system 104, a video server 106, a splicer 108, an edge QAM 110, an IP STB 112, a STB 114, a GSRM 116, and an ODMC 118. Other elements and/or couplings among the elements have been omitted as they would be apparent to skilled practitioners in the relevant art(s).

The traffic and billing system 102 provides traffic and billing (e.g. ad placement) scheduling information. The ad scheduling information may be used for ad selection and determination of which streams having ads should be provided with bandwidth. The ad management system 104 receives ad schedules from the traffic and billing system 102, determines which portions of the traffic and billing schedules are relevant to particular sets of video servers and splicers, and controls the video servers accordingly. The ad management system 104 may also be involved in acts described herein in conjunction with the Ad Selector.

The video server 106 may delivers audio-video content streams to the splicer 108, and may also deliver ads to the splicer 108, according to instructions provided in a traffic and billing schedule provided by the traffic and billing system 102.

The splicer 108 receives digital ad content and audio-video content streams from the video server 106 and inserts the ads into audio-video content streams. The edge QAM 110 converts digital streams, for example MPEG-2 Transport Streams communicated via IP encapsulation from ODMC 118, to QAM-RF signals for HFC distribution. The term 'MPEG' refers to the Motion Picture Experts Group and standards and technical specifications promulgated thereby. 'IP' refers to Internet Protocol. 'QAM' refers to Quadrature Amplitude Modulation. 'HFC' refers to Hybrid Fiber Coad.

The IP STB 112 receives and renders combined content/advertising streams at the subscribers locations via IP communication. Likewise, the STB 114 receives and renders combined content-advertising streams at the subscribers locations via HFC communication.

The GSRM 116, or Global Session and Resource Manager, handles channel change signals from IP STB 112 and-or STB 114, and routes MPEG Transport Streams from video server 106 accordingly via signaling to splicer 108. The ODMC 118, or On Demand Management Console, monitors and manages the Switched Digital Video network, including providing reporting information to verify proper function.

The GSRM 116 may also comprise logic to facilitate acts described herein, such as those acts described in conjunction with the Policy Manager and Bandwidth Resource Manager. In other embodiments, the logic for this purpose may be comprised by other system components in a centralized or distributed fashion.

Other examples and/or embodiments of a traffic and billing system 102, an ad management system 104, a video server 106, a splicer 108, an edge QAM 110, a IP STB 112, a STB 114, a GSRM 116, and a ODMC 118 may be apparent to skilled practitioners in the relevant art(s).

The various components of the system may, in some instances, be implemented as one or more computer systems comprising logic consistent with carrying out the acts described herein.

Custom Ad Selection and Delivery

An Ad Selector ("ad selector") selects candidate ads for one or more ad avail opportunities, where an ad avail as used herein means a viewing of the ad by one or more cable system subscribers. A Bandwidth Resource Manager ("bandwidth resource manager") may provide information about available bandwidth in the delivery system. These components, which may be implemented as logic in one or more devices (such as computer system devices), may interact with a Policy Manager ("policy manager") to weight ad avail opportunity versus bandwidth costs to delivery customized advertising to subscribers.

The policy manager may cause allocation of bandwidth and insertion of customized ads into multiple program streams including the same program content but different ad content. Content streams may be duplicated (i.e. replicated, cloned) at one or more locations in the network, and custom advertising suitable for a particular subscriber demographic "zone" inserted therein.

Different subscriber equipment, corresponding to the different demographic "zones", may map different program frequencies to duplicate content streams having advertising content that is custom the demographic zone of the subscriber inserted therein. The custom mapping of program channels to frequencies may be carried out be way of cable television switched digital broadcast technology, known to those skilled in the art. The mapping may change dynamically, including at or near ad avail time, or sooner, or at any point during program content delivery.

When weighing ad avail opportunity for custom ads versus the bandwidth costs of one or more duplicated streams to carry that content to different demographic zones, the policy manager may apply one or more of ad bit rate, ad format, ad encoding, the number of subscribers having demographic attributes compatible with the ad (i.e. the number in the demographic zone of the ad), the number of subscribers that will actually view the ad (e.g. those in the zone and presently using or likely to use their subscriber equipment to view the program content), and a value to advertisers of one or more ad views by the compatible subscribers.

The policy manager may perform the opportunity versus cost weighting at a local content delivery area level. In other words, the policy manager may weigh the bandwidth costs and available bandwidth, number of subscribers having demographic attributes compatible with the ad, the number of subscribers that will actually view the ad, the value to advertisers of one or more ad views by the compatible subscribers, and other factors within specific local delivery areas (sometimes know as local coax runs or local subscriber loops).

The policy manager may weight ad avail opportunity versus the bandwidth cost of cloning the content stream into which the ad will be inserted, either at a central level (e.g. video server level) or closer to the edge (e.g. at the splicer or edgeQAM).

As previously noted, the policy manager may weigh ad opportunity versus bandwidth costs for demographic subscriber groups for which subscriber equipment is presently active, as opposed to all such subscribers in the group(s).

The policy manager may cause multiple subscriber equipment on a same local content delivery area to switch to a single program frequency once custom advertising for the program has been delivered, so that duplicate program streams that carried custom advertising to multiple subscribers on the same local content area may be discontinued to save bandwidth.

The content streams to carry the custom advertising may be replicated at a splicer, edgeQAM, video server, or at some other point in the network.

Figure 2:
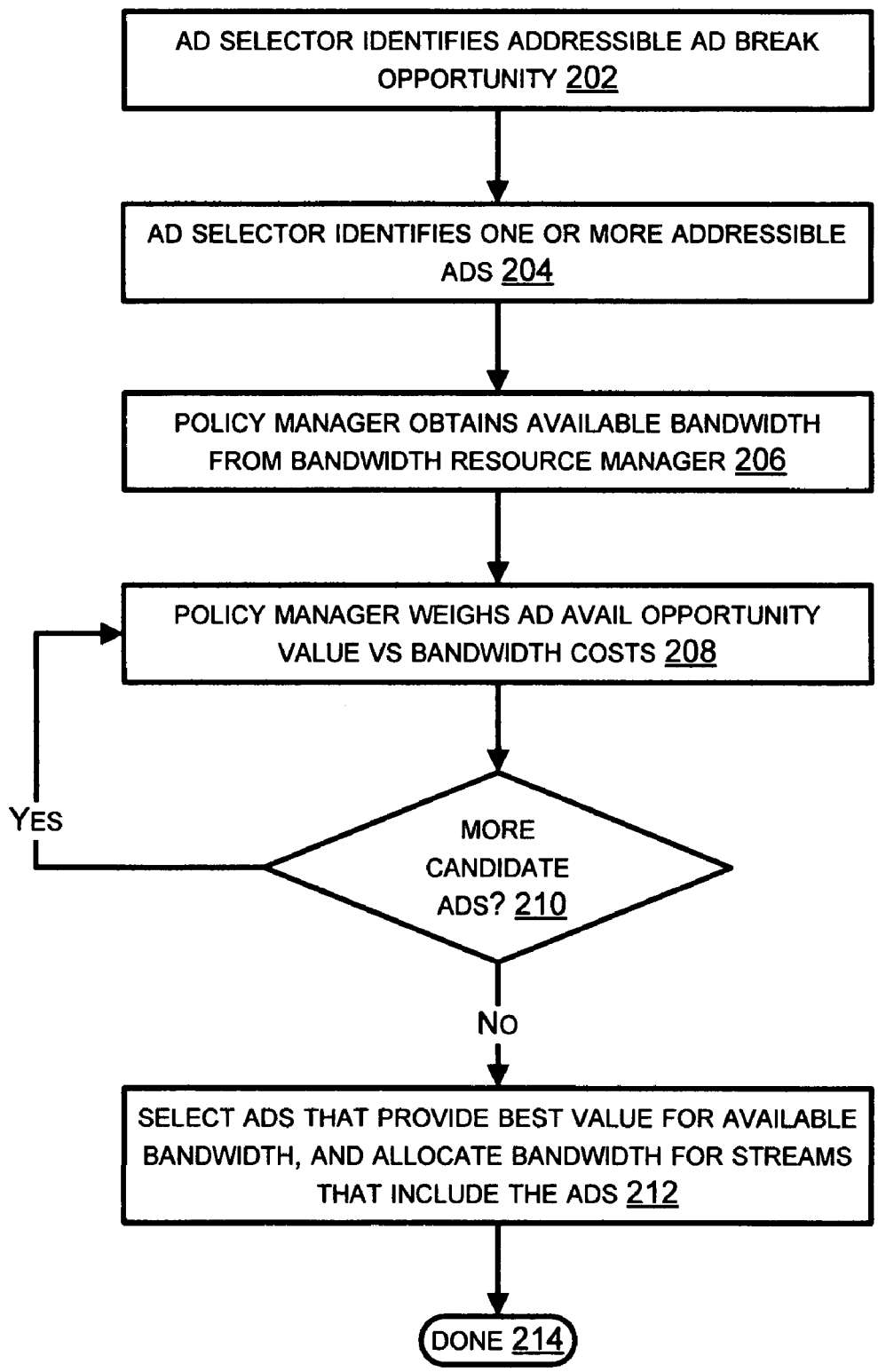
FIG. 2 is a flow chart of an embodiment of a process of customized ad selection and delivery.

FIG. 2 is a flow chart of an embodiment of a process of customized ad selection and delivery.

An ad selector identifies addressable ad break opportunities in one or more content streams that are presently, or will soon, be streamed, see 202. Suitable ads for the program streams are then identified, for example from ad schedules and other information, see 204. Once a pool of suitable candidate ads to avail are identified, the policy manager may be invoked to determine if multiple streams of the same content may be provided to deliver customized advertising from among the pool of candidate ads, for the same program content.

At 206 the policy manager may obtain available bandwidth from the bandwidth resource manager. The policy manager may weight ad avail opportunity for delivering custom ads, versus the bandwidth costs of doing so, see 208. If there are more candidate ads for this and other co-incident ad breaks, the policy manager weights the cost/benefit for those ads as well, see 210. Once a set of ads is identified as both suitable for the ad breaks, and beneficial overall despite the bandwidth costs associated with delivery of custom streams comprising the ads, bandwidth is allocated in the system for streams to carry those custom ads, see 212. The process concludes at 214.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A custom ad selection and delivery system comprising:
   one or more circuits, machine memories, and non-transitory computer-readable media comprising
   an ad selector to select candidate ads for one or more ad avail opportunities;
   a bandwidth resource manager to provide information about available bandwidth in a content delivery system; and
   a policy manager to weigh a likely number of ad exposures of an ad avail opportunity versus bandwidth costs to deliver customized advertising to subscribers, and to cause allocation of bandwidth and insertion of customized ads into multiple program streams comprising the same program content but different ad content, and to cause different subscriber equipment to map different program frequencies to similar content streams having advertising content inserted therein that is customized to different subscriber demographics.

2. The custom ad selection and delivery system of claim 1, wherein the policy manager to weigh ad avail opportunity versus bandwidth costs further comprises:
   the policy manager applying one or more of ad bit rate, ad format, and ad encoding.

3. The custom ad selection and delivery system of claim 1, wherein the policy manager to weigh ad avail opportunity versus bandwidth costs further comprises:
   the policy manager applying one or more of a number of subscribers having demographic attributes compatible with the candidate ad, a number of subscribers that will view the candidate ad, and a value to advertisers of one or more ad views of the customized ad by compatible subscribers.

4. The custom ad selection and delivery system of claim 1, wherein the policy manager to weigh ad avail opportunity versus bandwidth costs further comprises:
   the policy manager performing the ad avail opportunity versus bandwidth cost weighting at a local content delivery area level.

5. The custom ad selection and delivery system of claim 1, wherein the policy manager to weigh ad avail opportunity versus bandwidth costs further comprises:

the policy manager weighing the ad avail opportunity versus the bandwidth cost of cloning the content stream into which the customized ad will be inserted.

6. The custom ad selection and delivery system of claim 1, wherein the policy manager to weigh ad avail opportunity versus bandwidth costs further comprises:

the policy manager weighing the ad avail opportunity versus bandwidth costs for demographic subscriber groups for which subscriber equipment is presently active.

7. The custom ad selection and delivery system of claim 1, further comprising:

the policy manager causing multiple subscriber equipment in a same local content delivery area to switch to a single program frequency once custom advertising for the program has been delivered, so that duplicate program streams that carried custom advertising to multiple subscribers in the same local content area may be discontinued to save bandwidth.

8. The custom ad selection and delivery system of claim 1, further comprising:

replicating content streams that will comprise custom advertising at a splicer.

9. The custom ad selection and delivery system of claim 1, further comprising:

replicating content streams that will comprise custom advertising at an edge QAM.

10. The custom ad selection and delivery system of claim 1, further comprising:

replicating content streams that will comprise custom advertising at a video server.

* * * * *